United States Patent
Zhang et al.

(10) Patent No.: US 10,941,334 B2
(45) Date of Patent: Mar. 9, 2021

(54) FOAM SOLUTION AND PREPARATION THEREOF USED FOR PROFILE CONTROL AND PLUGGING IN HEAVY OIL THERMAL RECOVERY PROCESS AND METHOD OF PROFILE CONTROL AND PLUGGING

(71) Applicant: China University of Petroleum (East China), Qingdao (CN)

(72) Inventors: Chao Zhang, Qingdao (CN); Zhaomin Li, Qingdao (CN); Xingchang Xue, Qingdao (CN); Zhaohui Shang, Qingdao (CN); Haifeng He, Qingdao (CN); Linghui Xi, Qingdao (CN); Mingxuan Wu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/834,249

(22) Filed: Mar. 30, 2020

(65) Prior Publication Data
US 2020/0339866 A1 Oct. 29, 2020

(30) Foreign Application Priority Data
Apr. 26, 2019 (CN) .......................... 201910344008.2

(51) Int. Cl.
*C09K 8/594* (2006.01)
*E21B 33/13* (2006.01)
*C09K 8/584* (2006.01)

(52) U.S. Cl.
CPC .............. *C09K 8/594* (2013.01); *C09K 8/584* (2013.01); *E21B 33/13* (2013.01)

(58) Field of Classification Search
None
See application file for complete search history.

(56) References Cited

U.S. PATENT DOCUMENTS

| | | | | |
|---|---|---|---|---|
| 3,610,340 A | * | 10/1971 | Hutchison | C09K 8/52 166/311 |
| 6,271,001 B1 | * | 8/2001 | Clarke | A61K 8/73 435/72 |
| 2011/0000400 A1 | * | 1/2011 | Roddy | C04B 28/02 106/679 |
| 2013/0167756 A1 | * | 7/2013 | Chen | C04B 28/021 106/706 |
| 2013/0319673 A1 | * | 12/2013 | Pewitt | C04B 28/02 166/294 |
| 2016/0347990 A1 | * | 12/2016 | Vanzin | C09K 8/602 |
| 2017/0137694 A1 | * | 5/2017 | van Oort | C09K 8/46 |
| 2017/0240800 A1 | * | 8/2017 | Li | C09K 8/536 |

FOREIGN PATENT DOCUMENTS

| | | |
|---|---|---|
| CN | 101941825 A | 1/2011 |
| CN | 103233709 A | 8/2013 |
| CN | 105238380A A | 1/2016 |

\* cited by examiner

*Primary Examiner* — Anuradha Ahuja
(74) *Attorney, Agent, or Firm* — Volpe Koenig

(57) ABSTRACT

A foam solution for profile control and plugging in heavy oil thermal recovery process, a preparation method thereof, and a method for profile control and plugging.

12 Claims, 7 Drawing Sheets

FOAM SOLUTION AND PREPARATION THEREOF USED FOR PROFILE CONTROL AND PLUGGING IN HEAVY OIL THERMAL RECOVERY PROCESS AND METHOD OF PROFILE CONTROL AND PLUGGING

PRIORITY CLAIM & CROSS REFERENCE

The application claims priority to Chinese Application No. 201910344008.2, filed on Apr. 26, 2019, entitled "Foam Solution and Preparation Thereof Used for Profile Control and Plugging in Heavy Oil Thermal Recovery Process, and Foam System and Method of Profile Control and Plugging", which is herein specifically and entirely incorporated by reference.

FIELD

The present disclosure relates to the field of oil and gas field development, in particular to a foam solution and preparation thereof used for profile control and plugging in heavy oil thermal recovery process and method of profile control and plugging.

BACKGROUND

The foaming fluid is a gas-liquid two-phase or gas-liquid-solid three-phase fluid consisting of a foaming agent, a foam stabilizer, and has compressibility, good rheological property and stability. Because the foam fluid hydrostatic column has low pressure, small filtration loss, good sand carrying performance, strong drainage assisting capability and small damage to the stratum, the foam fluid hydrostatic column is widely applied to the fields of drilling, well completion, oil-gas well production increase the low-pressure, easy-leakage and water-sensitive strata.

The oily sludge is a common dangerous waste with recovery value in the oil exploitation process, and the main components of the oily sludge are water, petroleum hydrocarbons, solid sediment and the like, wherein the oil content reaches 5-50%. And as most oil fields in China enter the middle and later exploitation stages, the oil-bearing sludge yield is increased continuously due to serious sand production especially in the later stage of heavy oil thermal exploitation. According to statistics, the annual oil-containing sludge yield of China is nearly millions of tons, and the trend of increasing is still presented. Because the oily sludge contains a large amount of toxic and harmful pollutants such as benzene series, anthracene, phenols, heavy metals and the like, if the oily sludge is not properly treated, the oily sludge can cause serious pollution to the environment. However, because of its high oil content, recycling treatment is one of the major environmental concerns in the petroleum industry.

The incineration treatment technology of the oily sludge is widely applied as the most common harmless treatment mode, namely, the oily sludge is dehydrated in advance and then sent to an incinerator for incineration so as to realize the reduction and weight loss of the oily sludge, the treatment speed is high, the harmless degree is high, and meanwhile, the waste heat can be used for power generation and heat supply. But the comprehensive utilization rate of the incineration treatment of the oily sludge is lower and the waste degree of crude oil resources is higher. At present, the most common mode for producing fuel by utilizing oil-containing sludge is an oil-containing sludge coal-mixing combustion technology, namely, the oil-containing sludge and coal dust are mixed according to a specific proportion to prepare molded coal, and the molded coal is subjected to mixed combustion, so that the heat value of the fuel can be improved, meanwhile, the harmless treatment of the oil-containing sludge can be realized, and a new direction is provided for the resource utilization of the oil-containing sludge.

However, ash residues generated after combustion of the oil-containing sludge mixed coal also belong to solid waste generated by coal combustion, and the potential environmental hazard still exists.

CN101941825A discloses an environment-friendly brick produced by burning waste residues of oil-containing sludge renewable coal and a manufacturing method thereof. In the field of oil and gas field development, the particle foam stabilizer is increasingly applied to the practice of mines by virtue of the advantages of the particle foam stabilizer, however, the large-scale application of nano-particles such as nano-silica is restricted by the expensive price of the nano-particles, so that the important significance is achieved in searching cheap particle substitutes for foam stabilization of oil fields and mines.

CN 105238380A discloses a system and a method for reinforcing foam by adopting novel inorganic fine particles, namely, a reinforced foam system is formed by capturing pollutants with the particle size of less than or equal to 2.5 μm in the atmosphere and then compounding the pollutants with a surfactant, so as to realize the resource utilization of the pollutants.

CN 103233709A discloses a CCUS system and a method for exploiting super heavy oil reservoirs based on $CO_2$ assisted SAGD, wherein oil-containing sludge obtained by settling and separating the output liquid of the super heavy oil reservoirs in the method can be fed into a circulating fluidized bed boiler to be fired with coal, so that heat is provided for heavy oil thermal recovery, the coal consumption can be reduced, and the resource utilization of the oil-containing sludge is realized.

Therefore, the oily sludge is used for preparing the foam fluid after being subjected to harmless treatment, and the method has important significance for improving the resource utilization degree of the oily sludge and increasing the yield of an oil well.

SUMMARY

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present aims to provide a foam solution for profile control and plugging in heavy oil thermal recovery process, a preparation method thereof and a method for profile control and plugging. The raw material of the foam solution is easy to obtain, the preparation technology of the foam solution is simple, and the operation cost is low. The foam solution has good profile control and plugging effect in heavy oil thermal recovery process, and is favorable for heavy oil increasing. At the same time, the utilization of oil sludge and ash residue after combustion of oil sludge mixed with coal is realized, the coal consumption is reduced, and the economic benefit is high.

In a first aspect, the present disclosure provides a foam solution for profile control and plugging, which the foam solution comprises a foaming agent, oil-containing sludge mixed coal combustion ash residue, a dispersant and water, wherein the foaming agent is 1-1.5 parts by weight, the oil-containing sludge mixed coal combustion ash residue is 4-6 parts by weight, the dispersant is 0.25-0.5 parts by weight, and the water is 92-94.75 parts by weight, based on the 100 parts by weight of the foam solution, wherein the foaming agent is a mixture of sodium hexadecylbenzene sulfonate and sasanquasaponin.

According to the present disclosure, the weight ratio of the sodium hexadecylbenzene sulfonate to the sasanquasaponin is 3:(5-7).

According to the present disclosure, the particle size of the oil-containing sludge mixed coal combustion ash residue is 20-50 μm.

According to the present disclosure, the mass ratio of $SiO_2$ and $Al_2O_3$ in the oil-containing sludge mixed coal combustion ash residue is more than 80 percent.

According to the present disclosure, the dispersant is sodium lignosulfonate.

In a second aspect, the present disclosure provides a method for preparing foam solution for profile control and plugging, which comprises the following steps: mixing oil-containing sludge mixed coal combustion ash residue, foaming agent, dispersant and water, the foam solution was described above.

According to the present disclosure, a method for preparing the oil-containing sludge mixed coal combustion ash residue comprises the following steps:

mixing oily sludge and coal, preparing oil-containing sludge mixed coal particles with the particle size of less than 10 mm and the average particle size of 2-5 mm by adopting a granulation method, and then performing oxygen-enriched combustion.

According to the present disclosure, a mixture obtained by mixing the oil-containing sludge mixed coal combustion ash residue, the foaming agent, the dispersant and water is intermittently dispersed by using an ultrasonic cavitation device for assisting in dispersion.

According to the present disclosure, the present disclosure also provides a foam system for profile control and plugging in the process of heavy oil thermal recovery, which comprises a gas phase and a liquid phase, wherein the gas phase is nitrogen, and the liquid phase is the foam solution.

According to the present disclosure, the foam system has a foam mass of 50 percent to 90 percent, more preferably 60 percent to 80 percent. The foam mass is the percentage of the volume of gas in the foam system to the total volume of the foam.

In a third aspect, the present disclosure provides a method for profile control and plugging in heavy oil thermal recovery process by using foam system, which comprises the following steps:

enabling foam solution to pass through a foam generator and nitrogen to generate nitrogen foam on the ground, and then injecting the nitrogen foam into the stratum; or alternatively alternately injecting foam solution and nitrogen into the stratum through a slug; or alternatively and injecting foam solution and nitrogen into the stratum by means of simultaneous injection through the oil pipe and the casing;

wherein the foam solution was described above.

According to the present disclosure, wherein the foaming system comprises a gas phase and a liquid phase, wherein the gas phase is nitrogen, the liquid phase is a foam solution.

According to the present disclosure, the foam solution is prepared by mixing oil-containing sludge mixed coal combustion ash residue obtained by granulating and combusting oil-containing sludge mixed coal with a foaming agent, a dispersant and water. Sodium hexadecylbenzene sulfonate in the foaming agent has the characteristic of high temperature resistance, and the oily sludge and coal mixed combustion ash residue obtained by high-temperature incineration is also added in the preparation of the foam solution, so that the temperature resistance effect of the foam system is further enhanced (the foam system can resist the temperature of 200° C.).

According to the present disclosure, further, due to the fact that the clay content in the oil-containing sludge is high, ash residue particles obtained after the oil-containing sludge mixed coal is combusted contain metakaolin components, the metakaolin components can absorb water to swell in the process of dissolving in water, and the dispersibility of the ash residue particles is improved under the synergistic effect of the dispersant sodium lignosulfonate. After the foam system forms foam, the three-dimensional skeleton structure formed by ash residue particles in a liquid film can slow down the liquid discharge rate, and meanwhile, the metakaolin component can absorb water and expand, so that part of water is reserved, the evaporation effect of high temperature on the water is resisted, and the temperature resistance of the foam system is comprehensively improved.

In a preferred embodiment, after the oily sludge and the coal are mixed, the oily sludge mixed coal particles with uniform particle size are prepared by adopting a granulation technology and are matched with the oxygen-enriched combustion process of the circulating fluidized bed. And a membrane separation technology is adopted, oxygen and nitrogen in the air are fully utilized according to needs, wherein the oxygen is used for oxygen-enriched combustion of the circulating fluidized bed boiler, the combustion efficiency is improved, and the nitrogen is used as a gas-phase raw material of the foam system. Therefore, the combustion efficiency is greatly improved, the consumption of coal resources is saved, the uniform particle size of ash residue particles generated after combustion can be ensured, and the injection requirement of most heavy oil reservoirs can be met.

The foam system has a better profile control and plugging effect in the thermal recovery of the heavy oil, and is beneficial to the yield increase of the heavy oil. And the foam system further utilizes ash residue generated after the burning of the oil-containing sludge mixed coal in a resource manner, so that the integral resource utilization from the source to the final product is realized.

In addition, the raw materials of the foam system are easy to obtain, the preparation process of the foam solution is simple, the operation cost is low, and the economic benefit is high.

DETAILED DESCRIPTION

Figure 1:
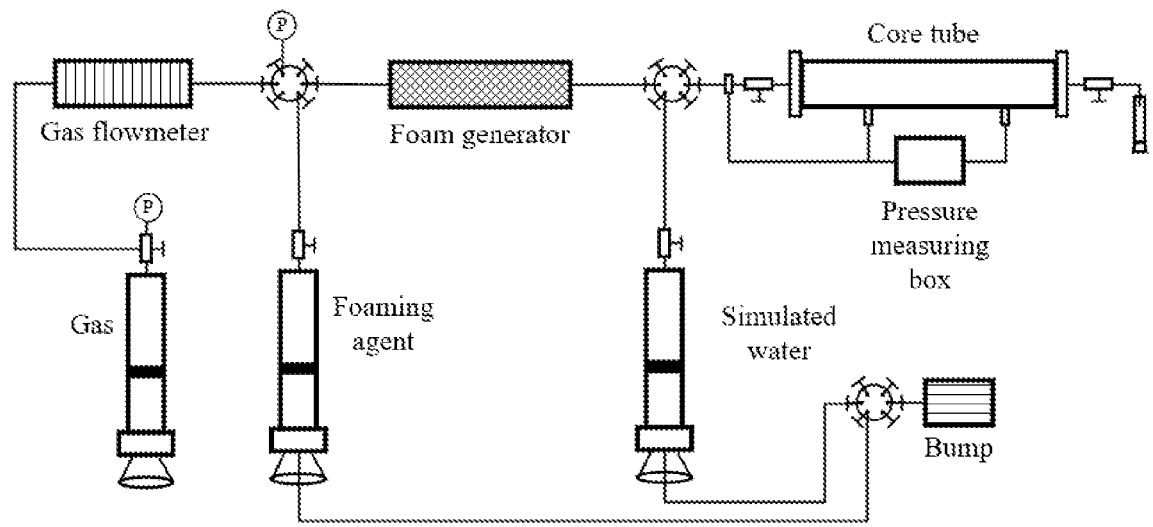
FIG. 1 is a foam system single core tube plugging effect evaluation experimental device provided by the present disclosure.

The following describes in detail embodiments of the present invention with reference to the drawings. It should be understood that the detailed description and specific examples, while indicating the preferred embodiment of the invention, are given by way of illustration and explanation only, not limitation.

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

In a first aspect, the present disclosure provides a foam solution for profile control and plugging, which comprises a foaming agent, oil-containing sludge mixed coal combustion ash residue, a dispersant and water, wherein the foaming agent is 1-1.5 parts by weight, the oil-containing sludge mixed coal combustion ash residue is 4-6 parts by weight, the dispersant is 0.25-0.5 parts by weight, and the water is 92-94.75 parts by weight, based on the 100 parts by weight of the foam solution, wherein the foaming agent is a mixture of sodium hexadecylbenzene sulfonate and sasanquasaponin.

According to the present disclosure, the sodium hexadecylbenzene sulfonate in the foaming agent has high temperature resistance, and the oil-containing sludge mixed coal combustion ash residue is also added into the foam solution, so that the foam solution can be used under the high temperature condition and has better temperature resistance, and the foam solution can be used for profile control and plugging in the thermal recovery of the heavy oil, thereby being beneficial to the yield increase of the heavy oil.

According to the present disclosure, in a preferred embodiment, the weight ratio of the sodium hexadecylbenzene sulfonate to the sasanquasaponin is 3:(5-7).

According to the present disclosure, preferably, the particle size of the oil-containing sludge mixed coal combustion ash residue is 20-50 µm, and the mass ratio of $SiO_2$ to $Al_2O_3$ in the oil-containing sludge mixed coal combustion ash residue is more than 80 percent.

According to the present disclosure, further, the mineral component in the oil-containing sludge and coal-mixed combustion ash residue is mainly activated metakaolin formed after sintering clay in the oil-containing sludge.

According to the present disclosure, preferably, the dispersant is sodium lignosulfonate.

In a second aspect, the present disclosure provides a method for preparing foam solution for profile control and plugging, which comprises the following steps: mixing the oil-containing sludge mixed coal combustion ash residue, foaming agent, dispersant and water.

Specifically, after the oil-containing sludge mixed coal combustion ash residue, the foaming agent, the dispersant and water are mixed, the oil-containing sludge mixed coal combustion ash residue particles and the foaming agent are mixed, stirred and dispersed to form a stable suspension because the surfaces of the oil-containing sludge mixed coal combustion ash residue particles are positively charged. The sodium hexadecylbenzene sulfonate (hexadecyl sodium benzene sulfonate) is negatively charged in the aqueous solution and can be adsorbed on the surfaces of ash residue particles under the action of electrostatic attraction force, so that the ash residue particles are stably suspended; meanwhile, the main mineral component metakaolin in the ash residue particles absorbs water to expand in the process of dissolving in water, and the dispersibility of the ash residue particles is improved under the synergistic action of the dispersant sodium lignosulfonate.

The sasanquasaponin (camellia saponin) in the foaming agent can be cooperated with ash residue particles adsorbing sodium hexadecylbenzene sulfonate to form stable foam, and the half life of a foam column is more than 7 days. The main mechanism is that the sodium hexadecylbenzene sulfonate and the sasanquasaponin synergistically reduce the gas-liquid interfacial tension, and the foam is easy to form; after foaming, ash residue particles are dispersed in a foam liquid film under the synergistic action of the dispersant sodium lignosulfonate to form a three-dimensional space network structure, so that the liquid separation speed is slowed down, gas diffusion is hindered, and the foam stability is improved; and because metakaolin formed after the clay in the oily sludge is sintered has the characteristic of water absorption expansion, the metakaolin can lock water in a three-dimensional space network structure of a foam liquid film, the influence of gravity drainage is reduced, and the foam stability is improved.

Furthermore, sodium hexadecylbenzene sulfonate in the foaming agent has good high temperature resistance, after ash residue particles subjected to high-temperature incineration are added, the temperature resistance effect of the mixed material is further enhanced (capable of resisting 200° C.), and after foam is formed, the three-dimensional skeleton structure formed by the ash residue particles in a liquid film can slow down the liquid discharge rate, metakaolin can absorb water and expand, partial water is reserved, the evaporation effect of high temperature on the water is resisted, and the temperature resistance of the foam solution is comprehensively improved, so that the foam solution can be used for profile control and plugging in heavy oil thermal recovery.

Preferably, the method further comprises preparing the oil-containing sludge mixed coal combustion ash residue according to the following steps:

mixing the oily sludge and coal, preparing oil-containing sludge mixed coal particles with the particle size of less than 10 mm and the average particle size of 2-5 mm by adopting a granulation method, and then performing oxygen-enriched combustion.

In a preferred embodiment, the boiler used for burning the oil-containing sludge mixed coal particles is a circulating fluidized bed combustion boiler.

Specifically, the oily sludge and coal are mixed by a granulation method to prepare oily sludge mixed coal particles with the particle size of less than 10 mm and the average particle size of 2-5 mm, and the oil-containing sludge mixed coal particles are sent into a circulating fluidized bed boiler for oxygen-enriched combustion, so that the combustion efficiency is greatly improved, the consumption of coal resources is saved, the uniform particle size of ash residue particles generated after combustion can be ensured, and the ash residue particles with the particle size of 20-50 μm are obtained.

Most heavy oil thermal recovery oil reservoirs have generally high permeability, and in the later thermal recovery period, because the sand production caused by long-time steam huff and puff is serious and a large pore passage is formed, the pore throat radius is large, so that ash residue obtained by combustion basically needs not to be treated, and the requirement of injected particle size can be met.

In a preferred embodiment, a mixed material obtained by mixing the oil-containing sludge mixed coal combustion ash residue, the foaming agent, the dispersant and water is intermittently dispersed by using an ultrasonic cavitation device for assisting in dispersion. The foam solution obtained after the ultrasonic cavitation device is intermittently utilized to assist dispersion has higher stability.

The present disclosure also provides a foam system for profile control and plugging in the process of heavy oil thermal recovery, which comprises a gas phase and a liquid phase, wherein the gas phase is nitrogen, and the liquid phase is the foam solution.

The foam system has a good profile control and plugging effect in the thermal recovery of the heavy oil, is beneficial to the yield increase of the heavy oil, realizes the resource utilization of the oil-containing sludge and the ash residue generated after the mixed coal of the oil-containing sludge is combusted, reduces the coal consumption and has high economic benefit.

Further, the nitrogen source may be commercially available nitrogen. In a preferred embodiment, the nitrogen source is nitrogen, which is a by-product of the membrane separation of air to produce oxygen when oxygen is used in the oxycombustion of the circulating fluidized bed boiler. The implementation mode can realize the utilization of two main products of oxygen and nitrogen according to requirements after the air membrane separation.

Preferably, the foam system has a foam mass of 50 to 90 percent, more preferably 60 to 80 percent.

The foam mass is the percentage of the volume of gas in the foam to the total volume of the foam.

In a third aspect, the present disclosure provides a method for profile control and plugging in heavy oil thermal recovery process by using the foam system, which comprises the following steps:

enabling foam solution to pass through a foam generator and nitrogen to generate nitrogen foam on the ground, and then injecting the nitrogen foam into the stratum; or alternatively alternately injecting the foam solution and nitrogen into the stratum through a slug; or alternatively and injecting the foam solution and nitrogen into the stratum by means of simultaneous injection through the oil pipe and the casing;

wherein the foam solution was described above.

The method realizes the specific use of the foam system in profile control and plugging in the thermal recovery process of the heavy oil reservoir, and is beneficial to yield increase of the heavy oil.

The present disclosure is further illustrated by the following examples, without restricting the scope of protection of the invention thereto.

The mass ratio of $SiO_2$ and $Al_2O_3$ in the oily sludge-coal blending combustion ash residue used in the following examples was 85 percent.

Example 1

Preparing a foam solution A1, which comprises the following steps:

(1) mixing and granulating the oil-containing sludge and coal by adopting a granulation method to prepare oil-containing sludge mixed coal particles with the particle size of 3 mm, and then feeding the oil-containing sludge mixed coal particles into a circulating fluidized bed boiler for oxygen-enriched combustion to obtain oil-containing sludge mixed coal combustion ash residue particles with the particle size of 35 μm.

(2) Adding the oil-containing sludge mixed coal combustion ash residue particles obtained in the step (1), the foaming agent and sodium lignosulfonate into water, and stirring and mixing; wherein the oil-containing sludge mixed coal combustion ash residue particles is 6 parts by weight, the foaming agent is 1.3 parts by weight (wherein the mass ratio of the sodium hexadecylbenzene sulfonate to the sasanquasaponin is 3:6), the sodium lignosulfonate is 0.4 parts by weight, and the water is 92.3 parts by weight.

(3) Subjecting the mixed material obtained in the step (2) to cavitation for 10 minutes by using an ultrasonic cavitation device, and standing for 1 minute every 1.5 minutes to prepare a foam solution A1.

Example 2

Preparing a foam solution A2, which comprises the following steps:

(1) mixing and granulating the oil-containing sludge and coal by adopting a granulation method to prepare oil-containing sludge mixed coal particles with the particle size of 5 mm, and then feeding the oil-containing sludge mixed coal particles into a circulating fluidized bed boiler for oxygen-enriched combustion to obtain oil-containing sludge mixed coal combustion ash residue particles with the particle size of 40 μm.

(2) Adding the oil-containing sludge mixed coal combustion ash residue particles obtained in the step (1), the foaming agent and sodium lignosulfonate into water, and stirring and mixing; wherein the oil-containing sludge mixed coal combustion ash residue particles is 5 parts by weight, the foaming agent is 1.5 parts by weight (wherein the mass ratio of the sodium hexadecylbenzene sulfonate to the sasanquasaponin is 3:5), the sodium lignosulfonate is 0.5 parts by weight, and the water is 93 parts by weight.

(3) Subjecting the mixed material obtained in the step (2) to cavitation for 10 minutes by using an ultrasonic cavitation device, and standing for 1 minute every 1.5 minutes to prepare a foam solution A2.

Example 3

Preparing a foam solution A3, which comprises the following steps:

(1) mixing and granulating the oily sludge and coal by adopting a granulation method to prepare oil-containing sludge mixed coal particles with the particle size of 2 mm, and then feeding the oil-containing sludge mixed coal particles into a circulating fluidized bed boiler for oxygen-enriched combustion to obtain oil-containing sludge mixed coal combustion ash residue particles with the particle size of 25 μm.

(2) Adding the oil-containing sludge mixed coal combustion ash residue particles obtained in the step (1), the foaming agent and sodium lignosulfonate into water, and stirring and mixing; wherein the oil-containing sludge mixed coal combustion ash residue particles is 4 parts by weight, the foaming agent is 1 parts by weight (wherein the mass ratio of the sodium hexadecylbenzene sulfonate to the sasanquasaponin is 3:7), the sodium lignosulfonate is 0.25 parts by weight, and the water is 94.75 parts by weight.

(3) Subjecting the mixed material obtained in the step (2) to cavitation for 10 minutes by using an ultrasonic cavitation device, and standing for 1 minute every 1.5 minutes to prepare a foam solution A3.

Example 4

A foam solution A4 was prepared according to the method of example 1, except that the mass ratio of sodium hexadecylbenzene sulfonate to sasanquasaponin in the foaming agent was 3:8.

Example 5

A foam solution A5 was prepared according to the method of example 1, except that the mass ratio of sodium hexadecylbenzene sulfonate to sasanquasaponin in the foaming agent was 3:4.

Comparative Example 1

A foam solution D1 was prepared according to the method of example 1 except that the foaming agent contained only sodium hexadecylbenzene sulfonate.

Test Example 1

The foam solutions A1-A5 and D1 obtained in examples 1 to 5 and comparative example 1 were stirred and foamed with a high-speed stirrer rotating at 7000 rpm for 5 min. After stirring was complete, the foam was poured into a 1000 mL measuring cylinder, and the initial volume of the foam was recorded at 400 mL at normal temperature and pressure, and the time taken for the foam to decay to half was recorded, the results being shown in table 1.

TABLE 1

| Item | A1 | A2 | A3 | A4 | A5 | D1 |
|---|---|---|---|---|---|---|
| Half life period/days | 7 | 6.8 | 6.7 | 5.4 | 4 | 1 |

Test Example 2

The foam system provided by the present disclosure is adopted to simulate the oil reservoir environment under the high-temperature condition of heavy oil thermal recovery, and a single core tube plugging effect experiment is carried out, and the experiment steps are as follows:

(1) The gas phase of the foam system was nitrogen and the liquid phase was foam solution A1 prepared in example 1.

(2) FIG. 1 is a foam system single core tube plugging effect evaluation experimental device. An experiment for evaluating the plugging capacity of injected foam is carried out according to a device shown in FIG. 1, the experiment temperature is 200° C., the back pressure valve is 5 MPa, the gas-liquid ratio is 2:1, the injection speed is 4 mL/min, the core permeability is 1.5 Darcy, and the pressure difference at two ends of a core pipe in the water flooding process, the foam flooding process and the secondary water flooding process after foam flooding is recorded. Wherein the foam system has a foam mass of 80 percent.

The resistance factor and the residual resistance factor of the foam system can be obtained by calculating the ratio of the highest pressure difference in the foam flooding process to the pressure difference in the water flooding process and the ratio of the highest pressure difference in the secondary water flooding process after foam flooding to the pressure difference in the water flooding process, wherein the resistance factor and the residual resistance factor are respectively 45 and 27, and the result shows that the foam system can still keep a good plugging effect under the stratum condition of 200° C.

The same experiment was carried out using the foam solutions A2 and A3 obtained in example 2 and example 3, respectively, for the liquid phase of the foam system, resulting in drag factors and residual drag factors for the foam system of 35 and 22, 37 and 21, respectively.

Test Example 3

The foam system provided by the present disclosure is adopted to simulate the oil reservoir environment under the high-temperature condition of heavy oil thermal recovery, and a double-core pipe profile control effect experiment is developed, and the experiment steps are as follows:

(1) The gas phase of the foam system was nitrogen and the liquid phase was foam solution A1 prepared in example 1.

Figure 2:
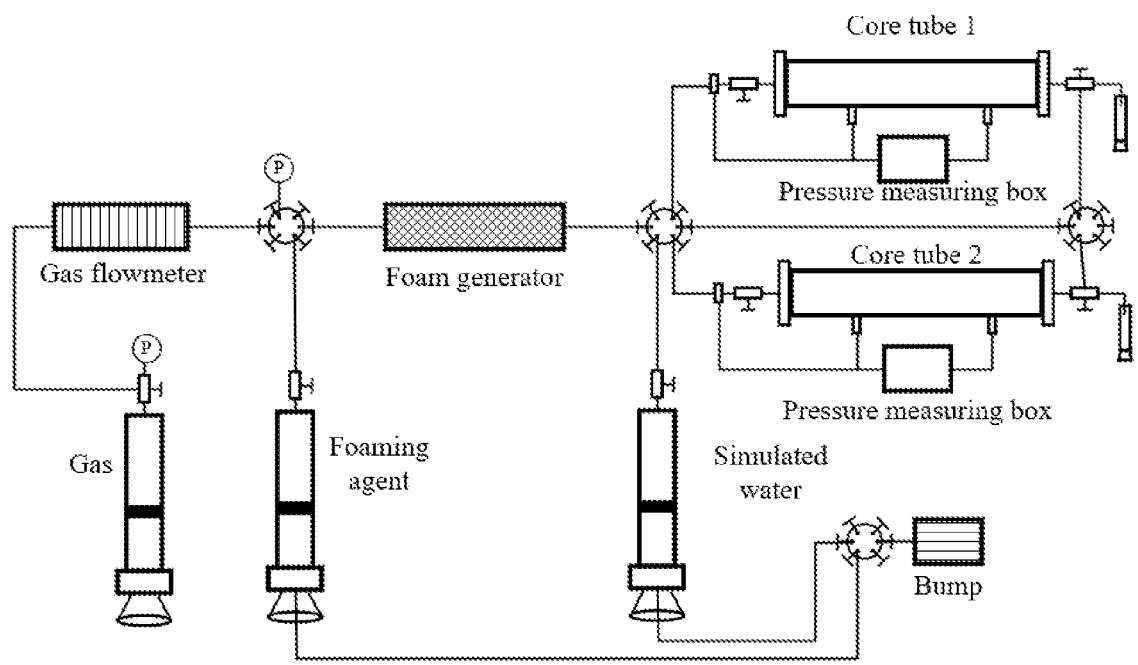
FIG. 2 is a section control effect evaluation experimental device for a foam system double core tube.

(2) FIG. 2 is a section control effect evaluation experimental device for a foam system double core tube. An experiment for evaluating the foam injection profile control capability is carried out according to the device shown in FIG. 2, the experiment temperature is 200° C., the back pressure valve pressure is 5 MPa, the gas-liquid ratio is 2:1, the injection speed is 4 mL/min, three experiments of permeability grade differences are carried out in total (the injection:permeability grade difference is a permeability ratio value of two rock cores and is used for representing the permeability difference), and the rock core parameters are shown in table 2. Injecting the foam system into the parallel core pipes, stopping injecting the foam after the pressure of different pressure measuring points tends to be stable, converting the foam system into subsequent water drive, stopping the experiment after the pressure of each pressure measuring point of the core pipes tends to be stable in the injection process, measuring the liquid output of the outlet of each core pipe by using a measuring cylinder in the whole experiment process, recording a numerical value every 20 min, simultaneously recording the pressure data of three different pressure measuring points of the core pipes, and comparing the temporary blocking and shunting effect of the foam in the foam injection process and the shunting effect of low-permeability cores with different permeability under the same permeability range. Wherein the foam system has a foam mass of 80 percent.

Figure 3:
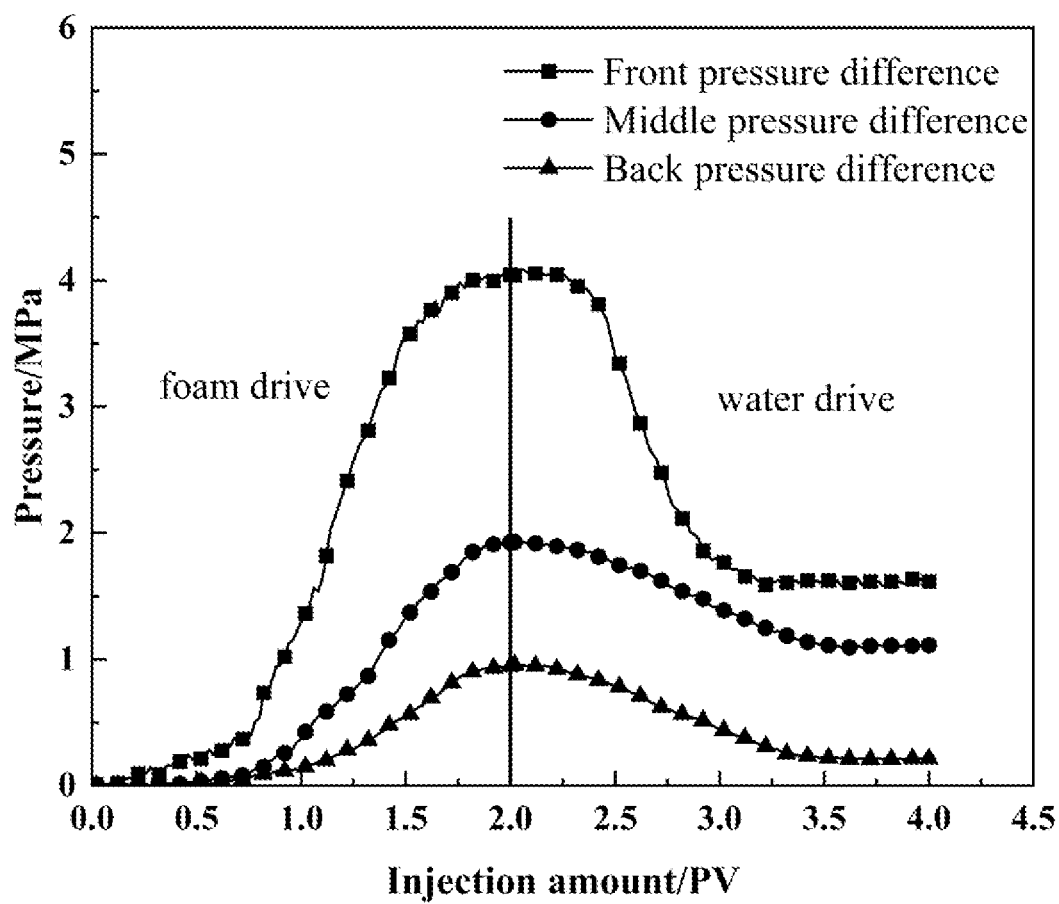
FIG. 3 is a graph of core pressure change at a permeability level difference of 5 and a permeability of $595 \times 10^{-3}$ μm$^2$.
Figure 4:
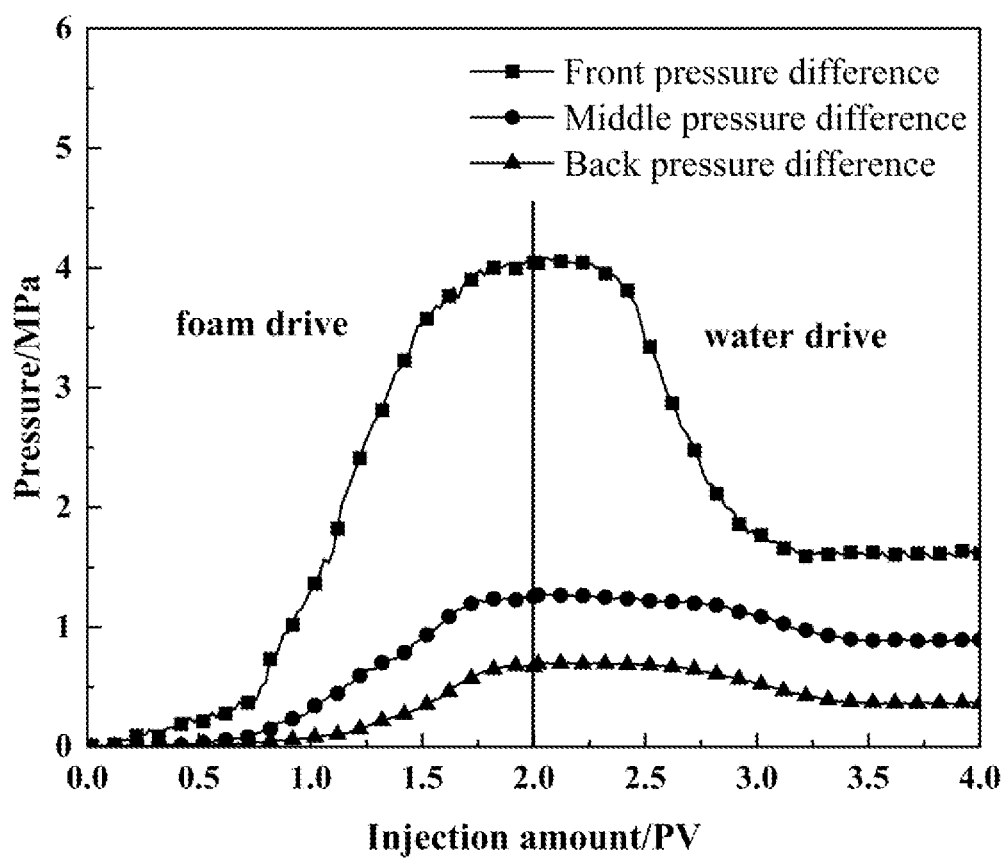
FIG. 4 is a graph of core pressure change at a permeability level difference of 5 and a permeability of $3075 \times 10^{-3}$ µm².
Figure 5:
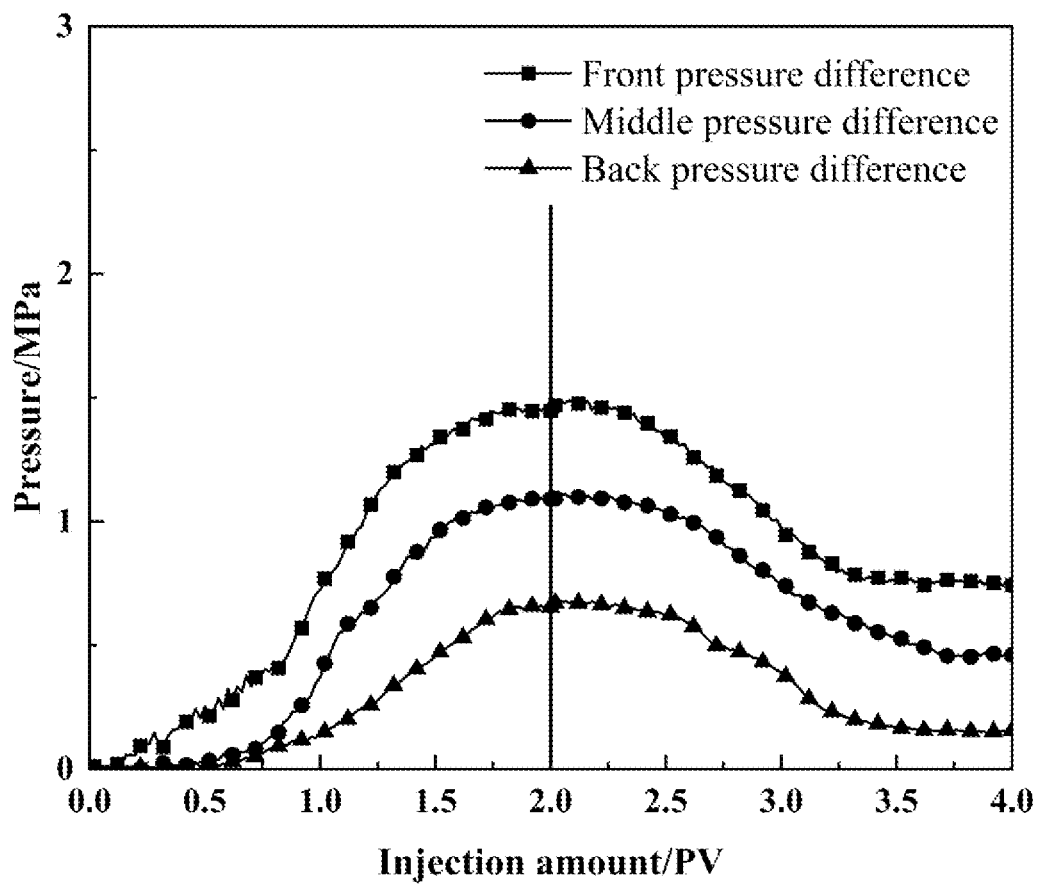
FIG. 5 is a graph of core pressure change at a permeability level difference of 10 and a permeability of $505 \times 10^{-3}$ µm².
Figure 6:
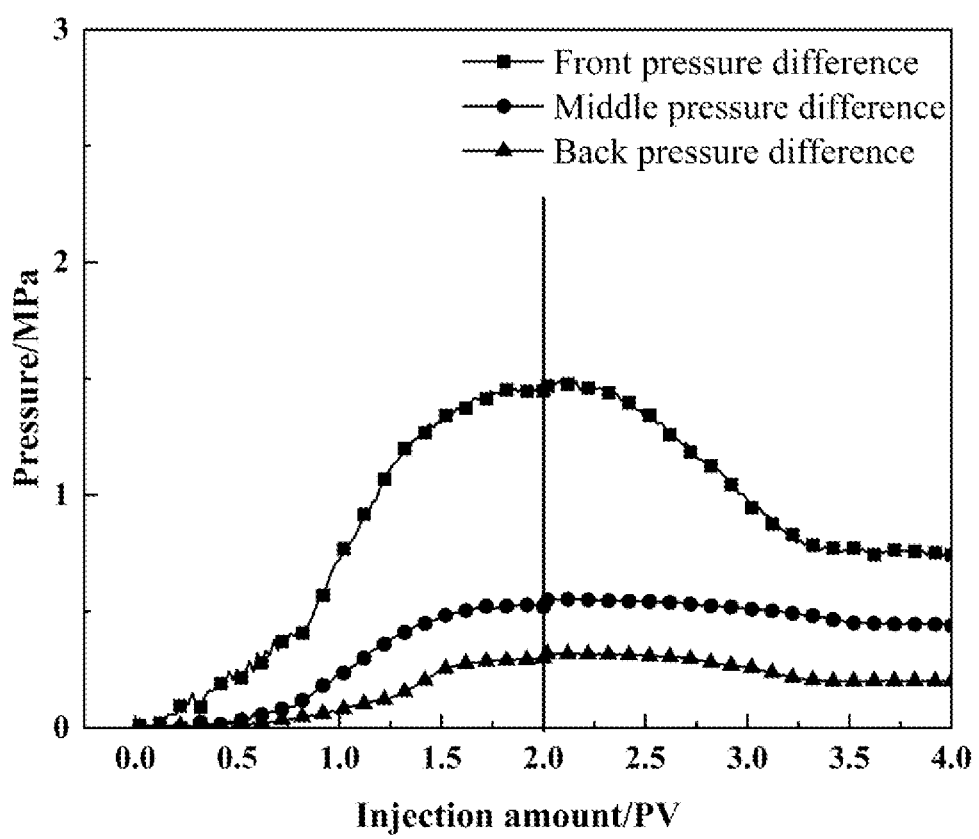
FIG. 6 is a graph of core pressure change at a permeability level difference of 10 and a permeability of $5150 \times 10^{-3}$ µm².
Figure 7:
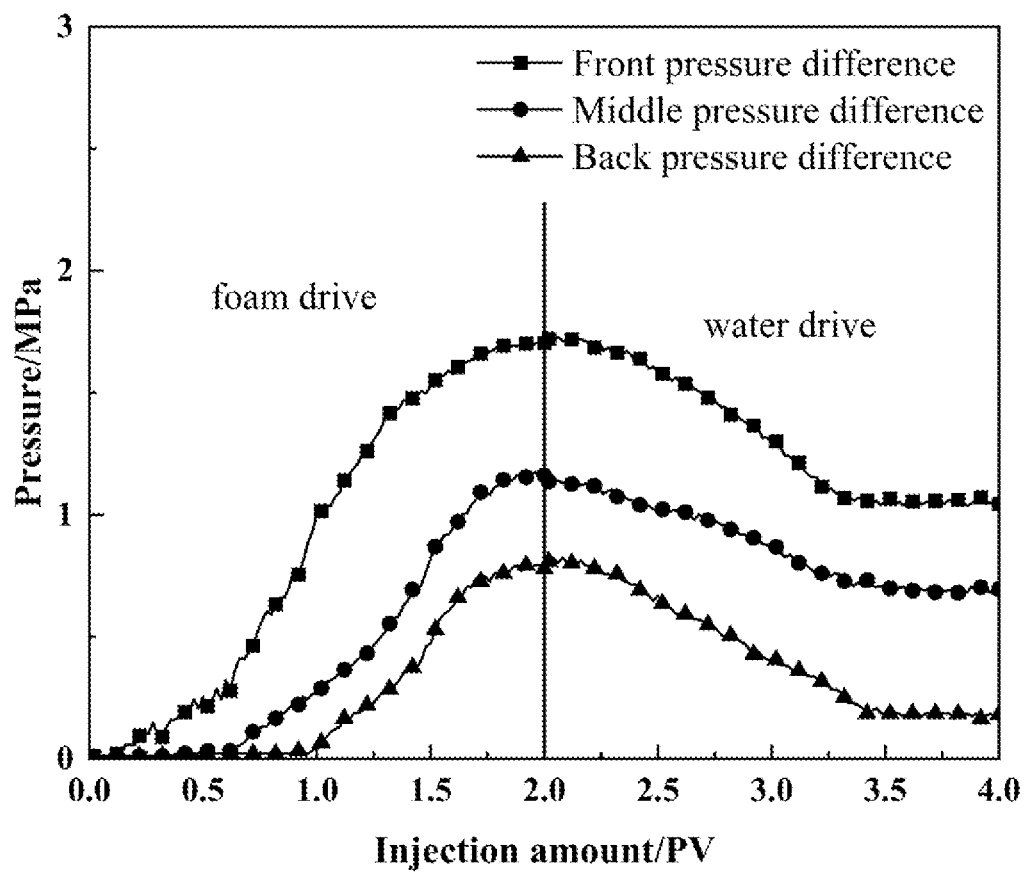
FIG. 7 is a graph of core pressure change at a permeability level difference of 15 and a permeability of $550 \times 10^{-3}$ µm².
Figure 8:
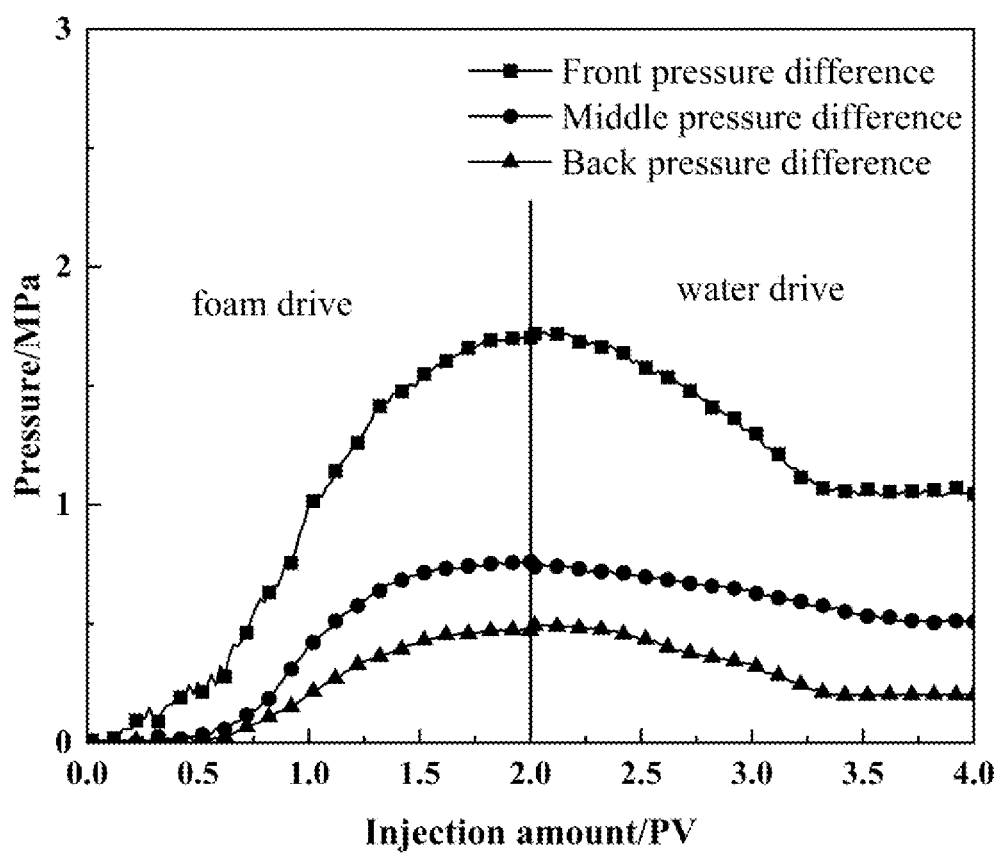
FIG. 8 is a graph of core pressure change at a permeability level difference of 15 and a permeability of $8150 \times 10^{-3}$ µm².

FIG. 3 is a graph of core pressure change at a permeability level difference of 5 and a permeability of $595 \times 10^{-3}$ $\mu m^2$;

FIG. 4 is a graph of core pressure change at a permeability level difference of 5 and a permeability of $3075 \times 10^{-3}$ $\mu m^2$;

FIG. 5 is a graph of core pressure change at a permeability level difference of 10 and a permeability of $505 \times 10^{-3}$ $\mu m^2$;

FIG. 6 is a graph of core pressure change at a permeability level difference of 10 and a permeability of $5150 \times 10^{-3}$ $\mu m^2$;

FIG. 7 is a graph of core pressure change at a permeability level difference of 15 and a permeability of $550 \times 10^{-3}$ $\mu m^2$;

FIG. 8 is a graph of core pressure change at a permeability level difference of 15 and a permeability of $8150 \times 10^{-3}$ $\mu m^2$.

Referring to FIG. 3, FIG. 4, FIG. 5, FIG. 6, FIG. 7 and FIG. 8, after the foam system is injected into the heterogeneous reservoir under the same permeability level difference, the heterogeneous reservoir has better injection performance in the low-permeability core, the injection pressure is increased, and the blocking effect on the high-permeability core is enhanced. Therefore, the foam system has a good profile control effect on a heterogeneous stratum with the permeability grade difference of 5-15 under a high-temperature environment.

The same experiment was carried out using the foam solutions A2 and A3 obtained in example 2 and example 3, respectively, for the liquid phase of the foam system, and the same results were obtained using the foam solution A1 obtained in example 1.

TABLE 2

| Core numbering | Permeability/.times.$10^{-3}$ μm$^2$ | Porosity/% | Grade difference of permeability |
|---|---|---|---|
| 1 | 595 | 24.54 | 5 |
| 2 | 3075 | 27.12 | 5 |
| 3 | 505 | 22.75 | 10 |
| 4 | 5150 | 29.30 | 10 |
| 5 | 550 | 23.65 | 15 |
| 6 | 8150 | 32.76 | 15 |

As can be seen from test example 1, the foam solution of the present disclosure has higher stability; as can be seen from the test examples 2 and 3, the foam system has a good profile control and plugging effect, is beneficial to increasing the yield of heavy in the thermal recovery of the heavy oil, realizes the resource utilization of the oily sludge and ash residue generated after the combustion of the oily sludge mixed coal, reduces the coal consumption and has high economic benefit.

The above content describes in detail the preferred embodiments of the present, but the present is not limited thereto. A variety of simple modifications can be made to the technical solutions of the present within the scope of the technical concept of the present, including a combination of individual technical features in any other suitable manner, such simple modifications and combinations thereof shall also be regarded as the content disclosed by the present present, each of them falls into the protection scope of the present present.

The invention claimed is:

1. A foam solution for profile control and plugging in oil and gas fields, wherein the foam solution comprises foaming agent, oil-containing sludge mixed coal combustion ash residue, dispersant and water, wherein the foaming agent is 1-1.5 parts by weight, the oil-containing sludge mixed coal combustion ash residue is 4-6 parts by weight, the dispersant is 0.25-0.5 parts by weight, and the water is 92-94.75 parts by weight, based on the 100 parts by weight of the foam solution, wherein the foaming agent is a mixture of sodium hexadecylbenzene sulfonate and sasanquasaponin.

2. The foam solution of claim 1, wherein the weight ratio of the sodium hexadecylbenzene sulfonate to the sasanquasaponin is selected from 3:5 to 3:7.

3. The foam solution of claim 1, wherein the oil-containing sludge mixed coal combustion ash residue has a particle form with a particle size of 20-50 μm.

4. The foam solution of claim 1, wherein the oil-containing sludge mixed coal combustion ash residue contains $SiO_2$ and $Al_2O_3$, and the mass ratio of the $SiO_2$ and $Al_2O_3$ is more than 80 percent.

5. The foam solution of claim 1, wherein the dispersant is sodium lignosulfonate.

6. A method for preparing the foam solution of claim 1, comprising:
mixing the oil-containing sludge mixed coal combustion ash residue, the foaming agent, the dispersant and the water.

7. The method of claim 6 further comprising a method for preparing the oil-containing sludge mixed coal combustion ash residue comprising:
mixing oily sludge and coal, preparing oil-containing sludge mixed coal particles with a particle size of less than 10 mm and an average particle size of 2-5 mm, and then performing oxygen-enriched combustion on the oil-containing sludge mixed coal particles to obtain the oil-containing sludge mixed coal combustion ash residue.

8. The method of claim 6, wherein a mixture obtained by the step of mixing the oil-containing sludge mixed coal combustion ash residue, the foaming agent, the dispersant and the water is intermittently dispersed with an ultrasonic cavitation device for assisting in dispersion.

9. A method for profile control and plugging in a heavy oil thermal recovery process by using a foam system, the method comprising any of:
(a) enabling nitrogen and the foam solution of claim 1 to pass through a foam generator at the same time to generate nitrogen foam above ground, and then injecting the nitrogen foam into a stratum;
(b) alternately injecting nitrogen and the foam solution of claim 1 into a stratum as a slug; or
(c) injecting nitrogen and the foam solution of claim 1 into a stratum by simultaneous injection through an oil pipe and casing.

10. The method of claim 9, wherein the foam system comprises a gas phase and a liquid phase, wherein the gas phase is nitrogen, and the liquid phase is the foam solution.

11. The method of claim 9, wherein the foam system has a foam mass of 50 percent to 90 percent.

12. The method of claim 11, wherein the foam system has a foam mass of 60 percent to 80 percent.

* * * * *